No. 817,540. PATENTED APR. 10, 1906.
C. D. ADAMS.
AGRICULTURAL IMPLEMENT.
APPLICATION FILED APR. 10, 1905.

3 SHEETS—SHEET 1.

WITNESSES:
John J. Kittle
U. E. Fay

INVENTOR
Charles D. Adams
BY Munn
ATTORNEYS

No. 817,540. PATENTED APR. 10, 1906.
C. D. ADAMS.
AGRICULTURAL IMPLEMENT.
APPLICATION FILED APR. 10, 1905.

3 SHEETS—SHEET 3.

WITNESSES:

INVENTOR
Charles D. Adams
BY
ATTORNEYS

UNITED STATES PATENT OFFICE.

CHARLES D. ADAMS, OF SYLVANIA, GEORGIA.

AGRICULTURAL IMPLEMENT.

No. 817,540.

Specification of Letters Patent.

Patented April 10, 1906.

Application filed April 10, 1905. Serial No. 254,702.

*To all whom it may concern:*

Be it known that I, CHARLES D. ADAMS, a citizen of the United States, and a resident of Sylvania, in the county of Screven and State of Georgia, have invented a new and Improved Agricultural Implement, of which the following is a full, clear, and exact description.

My invention relates to a machine which is adapted for purposes of general utility, and especially for the purpose of preparing and cultivating the soil. While I have called it an "agricultural" implement, it is to be understood that its utility is not limited to agricultural purposes, as it can be applied in many other occupations, as will be apparent from the description.

The principal objects of the present invention are to provide a machine of the character mentioned with a motor to be driven by electricity, gas, gasolene, or the like, to connect the motor with traction-wheels so as to propel the machine, and to attach various kinds of implements to it in such a manner that they can be readily operated either by the motor or by the forward motion of the machine, at the same time keeping the dimensions of the machine within narrow limits, so that it will be suitable for general use and so that it will not require an extraordinarily large expenditure of power in operation.

Further objects of the invention will appear in the course of the subjoined description.

Reference is to be had to the accompanying drawings, forming a part of this specification, in which similar characters of reference indicate corresponding parts in all the figures.

Figure 1:
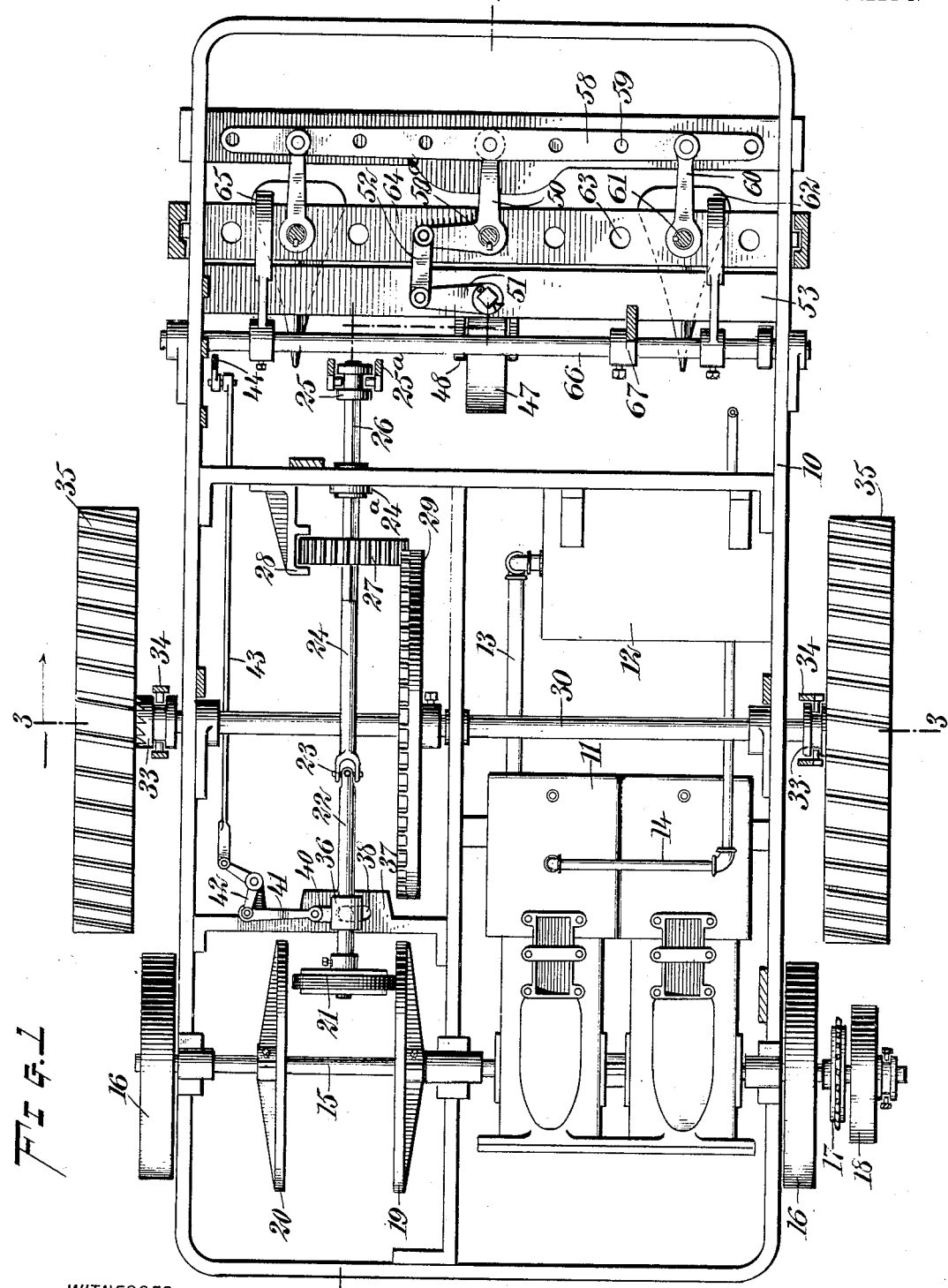
Figure 2:
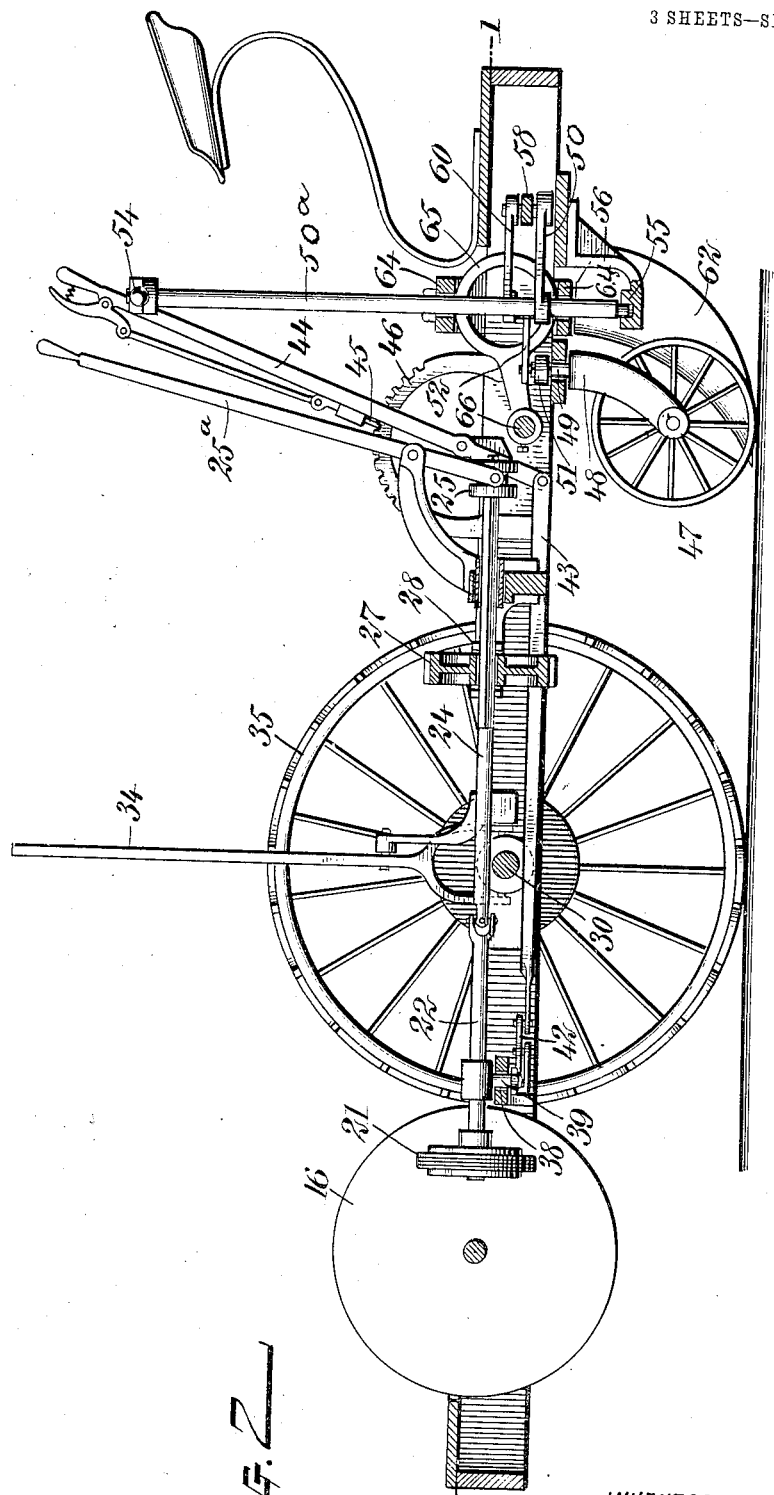
Figure 3:
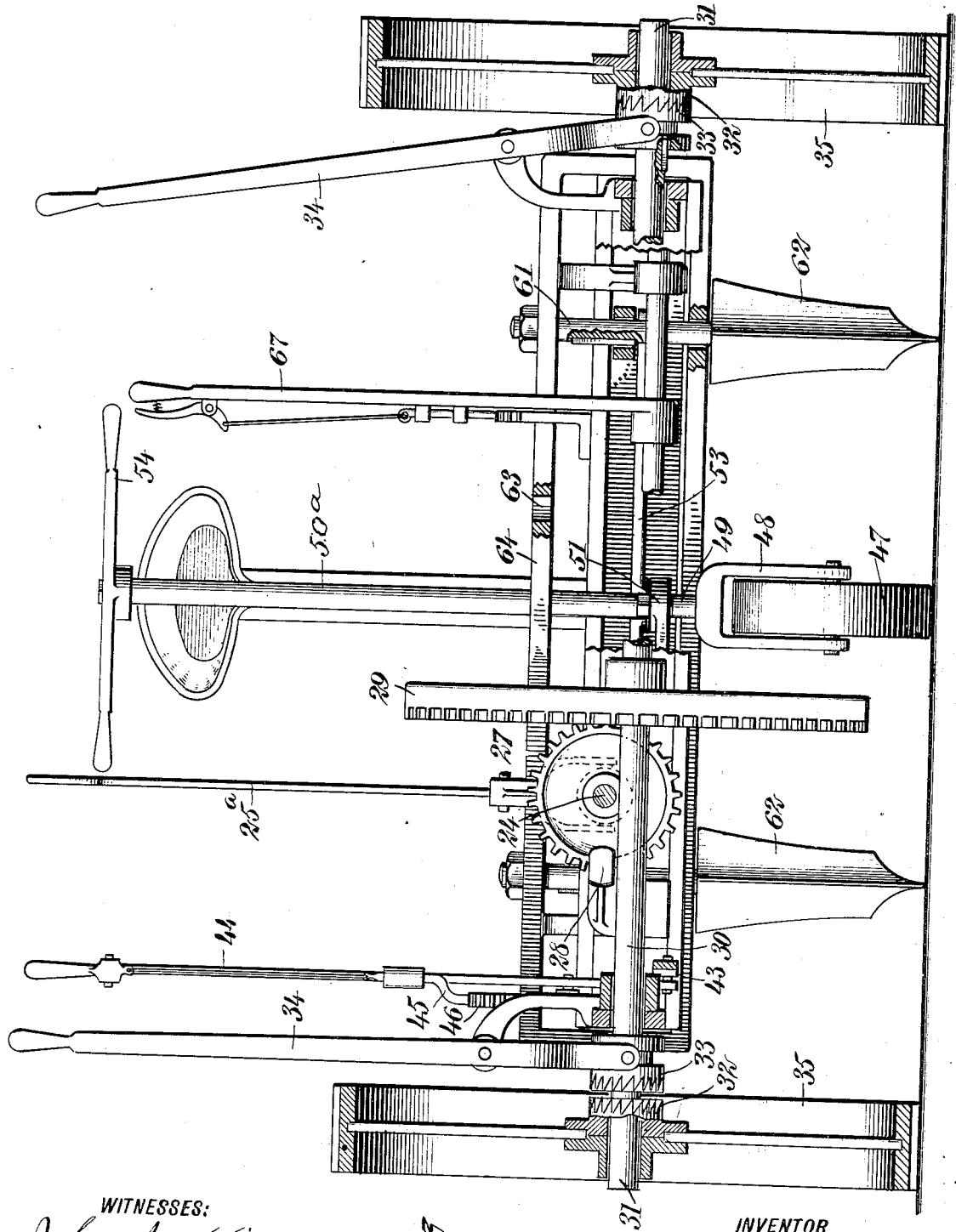

Figure 1 is a horizontal sectional view, on the line 1 1 of Fig. 2, of a machine constructed in accordance with the principle of my invention. Fig. 2 is a sectional view on the line 2 2 of Fig. 1, and Fig. 3 is a sectional view on the line 3 3 of Fig. 1.

The machine is provided with a frame 10, and on this machine is placed a motor 11 of any desired construction. When this motor is designed to be supplied with gas, gasolene, or oil, a supply-tank 12 is provided and connected with the motor by pipes 13 and 14. The motor is connected in any suitable manner with a counter-shaft 15, which is provided with a fly-wheel 16 for the usual purpose.

If desired, the shaft may be provided with the sprocket-wheel 17 for driving any desired kind of implement or it can be supplied with a clutch-pulley 18 to make the machine of general utility when not at work in the fields, as it may be coupled up with any desired kind of machine.

In order to propel the machine, the shaft 15 is provided with a pair of friction-wheels 19 and 20, between which is located a third friction-wheel 21, adapted to be moved into contact with the face of either of the first-mentioned wheels. This will provide for operating the wheel 21 in either direction and at any desired speed, according to the distance which it may be located from the shaft. The wheel 21 is mounted on a shaft 22, which is longitudinally and laterally movable, and is connected, preferably, by a universal joint 23 with a longitudinal sliding shaft 24. This shaft is provided with a pair of collars 25, upon which a lever 25ª, pivoted upon the frame, is adapted to operate to reciprocate the shaft. The shaft 24 has a bearing in a bushing 24ª and has a square portion 26, passing through said bushing and through a gear-wheel 27. This gear-wheel is slidably mounted with respect to the shaft, but is held in a stationary position by a bracket 28 while the shaft slides through it. The gear-wheel meshes with a gear 29 upon a main shaft 30. At the two ends of the shaft 30 are a pair of extension-shafts 31, each having a clutch member 32, adapted to engage with a clutch member 33 on the shaft 30. A pair of levers 34 are pivoted upon the frame for operating the clutch members 33, so as to throw either or both of the traction-wheels 35, which are mounted upon the extension-shafts 31, out of operative connection with the shaft 30. This provides for steering the machine, as will be readily understood.

The mechanism so far described is capable of operating to propel the machine in one direction. If it is desired to reverse the direction of motion of the machine, the shaft 22 is moved laterally, so that the wheel 21 comes into contact with the other one of the friction-wheels. For this purpose the shaft 22 is journaled in a movable bearing 36, sliding upon a bar 37 on the frame. The bar 37 is provided with a slot 38 for this purpose and the bearing 36 with a stud 39, passing through the slot. Connected with an extension 40 on the bearing is a link 41, connected with a bell-crank 42 and the latter connected, through a link 43, with a lever 44. This lever is provided with a catch 45 and a toothed segment 46 for holding it in any desired position. By the mechanism just described the direction of rotation of the shaft 30 and traction-wheels can be readily regulated and reversed.

In order to assist in the guiding of the machine, a guide-wheel 47 is provided, preferably located in the central line of the machine and mounted upon a bracket 48, which is capable of turning upon a pivot 49. For turning this wheel a lever 50 is provided, this lever being connected with an arm 51 upon the bracket 48 by a link 52. The pivot 49 is mounted to oscillate in a cross-bar 53 on the frame, and the bell-crank is adapted to turn the bracket 48 and wheel about the pivot 49. The lever is mounted upon a vertical rod 50ª, which is provided with handles 54 for turning it, the rod being pivoted in a socket 55, located on a bracket 56, suspended from the under side of the frame. The lever 50 is connected with a movable frame 58. This frame is provided with a series of perforations 59, in any of which a series of links 60 may be pivoted. Each one of these links is also connected with a vertical rod 61, upon which a tooth 62 of an agricultural implement is mounted. The rods 61 are pivoted in perforations 63 in a transverse frame 64. The operation of the rod 53 to turn it about itself as a center will obviously result in a change in the angle at which the plowshares or harrow-teeth are situated with respect to the central line of the vehicle, and the direction in which they point will be parallel at all times to the direction of the wheels 47. Consequently there will be a coaction between these devices, and the steering of the vehicle will be accomplished with either, while it will not interfere with the operation of the cultivator and will not be impeded by them.

The frame 64 consists of two bars separated from each other, and between them is mounted an operating member 65. This member is pivoted upon a shaft 66, which is adapted to be turned by a lever 67, mounted thereon. Upon turning the shaft 66 the operating member will engage one of the members of the frame 64 and raise or lower it.

It will be seen from this description that the machine, whether constructed in the form shown or in any other form which is included within the scope of my invention, is capable of necessary adjustments for use with all kinds of cultivating implements and also that it is capable of turning and performing all the manipulations necessary in that class of work. It will also be clear how the attachments mentioned above can be supplied, so that the machine can be used for other than cultivating purposes. Moreover, a spiral screw in the frame bolted on the front of the machine and run by the sprocket-wheel 17 makes an excellent ditching-machine.

This invention can also be applied to a smaller machine for lighter work, so that it can be operated by a person walking.

Having thus described my invention, I claim as new and desire to secure by Letters Patent—

1. The combination of a main frame, a transverse frame comprising a pair of bars one located above the other, wheels upon which said main frame is mounted, a motor for propelling the frame on the wheels, cultivating devices depending from the transverse frame, an operating member connected with said bars and movably mounted with respect to the main frame, and means for swinging the operating member.

2. The combination of a main frame, a motor mounted thereon, traction-wheels, connections between the motor and the traction-wheels, a second frame on the main frame provided with vertical perforations, a rod mounted to turn in said perforations, a lever connected with said rod and having arms extending in opposite directions, a guide-wheel connected with one of said arms, a movable frame connected with the other arm, a plurality of cultivating implements mounted upon the transverse frame, and a link connected with each cultivating implement and pivotally connected with the third frame.

3. The combination of a main frame, a motor mounted thereon, traction-wheels, connections between the motor and the traction-wheels, a second frame on the main frame provided with vertical perforations, a rod mounted to turn in said perforations, a lever connected with said rod and having arms extending in opposite directions, a guide-wheel connected with one of said arms, a movable frame connected with the other arm, a plurality of cultivating implements mounted upon the transverse frame, and a link connected with each cultivating implement and pivotally connected with the third frame; said transverse frame comprising a pair of bars located at a distance from each other, an operating member mounted between said bars, and means for moving the operating member.

4. The combination of a main frame, a motor thereon, traction-wheels, connections between the motor and the traction-wheels, a transverse frame on the main frame provided with perforations, a rod mounted to turn in said perforations, a lever connected with said rod and having arms extending in two directions, a guide-wheel connected with one of said arms, a movable frame connected with the other, cultivating implements mounted on the transverse frame, a link rigidly connected with each cultivating implement and pivotally connected with the third frame, and means for vertically moving the transverse frame.

5. The combination of a main frame, means for propelling it, a transverse frame mounted on the main frame, a rod pivotally mounted on said transverse frame, a lever connected with said rod and having arms extending in two directions, a guide-wheel connected with one of said arms, a movable frame connected with the other arm, a cultivating implement mounted on the transverse frame, and a link rigidly connected with the cultivating implement and pivotally connected with the third frame.

6. The combination of a frame, a pair of traction-wheels mounted thereon, means for operating the traction-wheels, a guide-wheel mounted to turn on a vertical axis, a lever connected with the guide-wheel and having an arm extending therefrom, a transverse frame on the first-mentioned frame, cultivating devices pivotally mounted on the last-named frame and connected with the second frame, and means for turning said lever.

7. The combination of a main frame, a transverse frame thereon provided with vertical perforations, a rod mounted to turn in said perforations, a lever connected with said rod and having arms extending in opposite directions, a guide-wheel connected with one of said arms, a movable frame connected with the other, a series of cultivating implements mounted upon the transverse frame, and a link rigidly connected with each cultivating implement and pivotally connected with the third frame.

8. The combination of a main frame, a transverse frame thereon provided with vertical perforations, a rod mounted to turn in said perforations, a lever connected with said rod and having arms extending in opposite directions, a guide-wheel connected with one of said arms, a movable frame connected with the other, a series of cultivating implements mounted upon the transverse frame, a link rigidly connected with each cultivating implement and pivotally connected with the third frame, and means for vertically moving the transverse frame.

9. The combination of a main frame, a transverse frame thereon provided with vertical perforations, a rod mounted to turn in said perforations, a lever connected with said rod and having arms extending in opposite directions, a guide-wheel connected with one of said arms, a movable frame connected with the other, a series of cultivating implements mounted upon the transverse frame, and a link rigidly connected with each cultivating implement and pivotally connected with the third frame; said transverse frame comprising a pair of bars located at a distance from each other, a yoke mounted between said bars, and means for moving the yoke.

10. The combination of a main frame, a transverse frame comprising a pair of bars one located above the other, cultivating devices depending from said transverse frame, an operating member connected between said bars and pivotally mounted with respect to the main frame, and means for swinging the operating member upon its pivot.

In testimony whereof I have signed my name to this specification in the presence of two subscribing witnesses.

CHARLES D. ADAMS

Witnesses:
J. A. BAZEMORE,
J. C. OMSTREET.